United States Patent [19]

Chireau et al.

[11] 4,118,551

[45] Oct. 3, 1978

[54] MERCURY-FREE ZINC ELECTRODE

[75] Inventors: Roland F. Chireau, Quaker Hill, Conn.; Ronald G. Gunther, Troy, Mich.

[73] Assignee: Yardney Electric Corporation, Pawcatuck, Conn.

[21] Appl. No.: 847,357

[22] Filed: Oct. 31, 1977

[51] Int. Cl.$^2$ .................... H01M 4/24; H01M 10/24
[52] U.S. Cl. .................................... 429/207; 429/217; 429/231
[58] Field of Search ................ 429/57, 207, 217, 229, 429/231, 230, 206, 232

[56] References Cited

U.S. PATENT DOCUMENTS

| | | | |
|---|---|---|---|
| 434,458 | 8/1890 | Pepper, Jr. | 429/228 X |
| 896,981 | 8/1908 | Fiedler | 429/217 |
| 3,954,506 | 5/1976 | Sullivan | 429/229 X |
| 4,001,467 | 1/1977 | Sullivan | 429/229 X |
| 4,004,944 | 1/1977 | Sandera et al. | 429/215 |

*Primary Examiner*—Anthony Skapars
*Attorney, Agent, or Firm*—Donald E. Nist

[57] ABSTRACT

A mercury-free negative zinc electrode is described for use in secondary alkaline electrochemical cells. It contains an active zinc material and lead acetate or cadmium acetate substantially homogeneously dispersed in a non-ionic binder which is an hydroxy alkyl cellulose. The aforementioned constituents are typically admixed to form a paste which is compressed against opposing sides of a current collector to form a zinc electrode.

9 Claims, No Drawings

MERCURY-FREE ZINC ELECTRODE

BACKGROUND OF THE INVENTION

This invention relates to alkaline secondary electrochemical cells which utilize zinc as the active electrode material and, more particularly, it relates to the use of mercury-free zinc electrodes in such cells.

Zinc is used as the negative electrode material in alkaline electrochemical cells for a number of reasons including its high half-cell voltage, its low polarization, and its high limiting current density on discharge. However, a number of adverse effects result from the use of zinc in alkaline cells. Because it is thermodynamically unstable in alkaline media, zinc self-discharges significantly while standing. Such discharge is accompanied by hydrogen gas evolution. Together, these reactions produce electrode corrosion and shortened shelf life.

In order to overcome the aforementioned disadvantages while still taking advantage of the benefits derived from the use of zinc, battery manufacturers normally include a small amount of a material capable of raising the hydrogen overvoltage of zinc, e.g., 1-4% of mercury in the form of HgO, in zinc electrodes to reduce self-discharging of the latter and to suppress evolution of hydrogen gas.

Although the use of mercury in zinc electrodes is advantageous, its presence in such cells and the processes associated with the introduction of mercury into such cells present both environmental and health hazards. Therefore, it would be desirable to be able to produce mercury-free zinc electrodes having electrochemical characteristics similar to or better than mercury-containing zinc electrodes.

Inorganic additives other than mercury have been included in zinc electrodes for some time in order to reduce the corrosion of such electrodes by reducing their self-discharge in alkaline solution. Suggested additives have included: lead and lead compounds such as lead oxide, lead hydroxide, lead sulfide, and lead acetate; indium hydroxide; stannous chloride; cadmium oxide and cadmium acetate; and thallium oxide. The aforementioned additives may be used in absence of, or in combination with, mercury in zinc electrodes. Exemplary of the use of such additives in zinc electrodes are U.S. Pat. Nos. 3,639,176, 3,642,539, 3,847,669, 3,816,178 and 3,785,868. Although these additives have been found to be partially effective in reducing self-discharge of zinc electrodes in alkaline media, the same additives may adversely affect the potential-current curve on discharge, particularly at high battery drain rates.

In order to utilize the various additives in zinc electrodes, binders such as carboxymethyl cellulose, polyvinyl alcohol and methyl cellulose have typically been used. They facilitate introduction of the additive into the zinc electrode and retain the additive in the electrode. However, use of most of those binders produces adverse effects as a result of precipitation reactions taking place between the binder and additive. In particular, otherwise useful lead acetate and cadmium acetate additives precipitate with carboxymethyl cellulose and sodium carboxymethyl celluose to prevent homogeneous dispersion of the additive in the electrode. Without such homogeneous dispersion, localized hydrogen gas evolution can still occur throughout the electrode. Furthermore, others of the aforementioned binders cannot be used successfully with lead and cadmium acetate because they also cause a "salting out" effect and massive precipitation reactions.

SUMMARY OF THE INVENTION

This invention is embodied in a negative mercury-free zinc electrode and in alkaline secondary batteries incorporating such zinc electrodes therein. More specifically, the herein-described mercury-free negative zinc electrode comprises a zinc active electrode material and a water-soluble cadmium or lead salt, e.g., lead acetate or cadmium acetate, dispersed substantially uniformly in a non-ionic binder material which is an hydroxy alkyl cellulose.

Use of the cadmium and lead acetates, together with an hydroxy alkyl cellulose binder, provides several advantages over the prior art. Because of the water-solubility of the acetate compounds, the lead and cadmium can be relatively uniformly dispersed throughout the zinc electrode material by utilizing an aqueous solution of the cadmium and/or lead salt. Additionally, the binder material used herein provides the required binding without interfering with the dispersion of the cadmium and/or lead salt throughout the zinc electrodes. The foregoing manufacturing advantages are obtained together with improvements in cycle life, capacity maintenance and hydrogen gas evolution reduction. In fact, tests have shown that capacity maintenance is improved over zinc electrodes containing mercury.

DESCRIPTION OF THE PREFERRED EMBODIMENT

The herein described zinc electrode comprises a substantially homogeneous combination of a zinc active electrode material, an additive or doping agent, and a binder therefor. Additionally, the zinc electrode will also usually include a current collector. Furthermore, other materials such as mechanical strengthening agents, conductive diluents, etc., which are well known in the art may also be utilized in the zinc electrode.

The zinc active electrode material may be zinc in its electrochemically charged (metallic) state or zinc in its electrochemically discharged (combined) state, e.g. zinc oxide (ZnO).

The additive or doping agent is a water-soluble lead or cadmium compound. Preferably lead acetate or cadmium acetate is employed. These compounds may be used alone or in combination, depending upon the particular application.

The binder is non-ionic. It is a member of the hydroxy alkyl cellulose family. The alkyl group or radical thereof may have any number of carbon atoms provided that the particular hydroxy alkyl cellulose utilized is water-soluble. Preferably, the alkyl group of the cellulose binder contains one to four carbon atoms because of the availability and water solubility of the resulting hydroxy alkyl cellulosics. Useful binders include hydroxy methyl cellulose; hydroxy ethyl cellulose; hydroxy propyl cellulose and hydroxy butyl cellulose.

The additive is used in amounts between about 0.05% to about 10% by weight of the weight of the active zinc material in its metallic form. Concentrations above about 10% by weight may be harmful to electrode performance, while concentrations below about 0.05% may be insufficient for the intended purposes. Preferably, the additive is used in amounts between about 1% and about 1.5% by weight of the weight of the zinc material (metal basis).

The amount of binder utilized is an effective amount for dispersing the additive in the active zinc electrode material and for binding the various constituents of the zinc electrode together to form a unitary cohesive structure. The upper limit on the amount of binder is governed by the desirability of maximizing the amount of active electrode material per unit volume of electrode in order to maximize cell capacity. The binder will usually be used in a range between about 1% and about 5% by weight of the weight of zinc active material (metal basis).

Manufacture of the herein-described electrodes may be accomplished in various ways. It is only necessary that the additive be substantially homogeneously dispersed through the zinc additive electrode material. For example, the herein-described zinc electrode may be prepared by first mixing zinc oxide with the additive in powder form, kneading the resulting mixture with an aqueous solution of the binder to produce a pasty composition, and thereafter casting that composition into sheet form. The sheets so formed may be dried at elevated temperatures, e.g. 95° C. Plates may then be punched from the dried sheets and used individually or in stacked (laminated) form. An electrically conductive metallic grid structure (current collector) provided with suitable electrical connections (wire or tab leads) is sandwiched between two or more plates to form an electrode assembly.

As noted hereinbefore, various components which do not form an essential part of the herein-described invention may be included in the zinc electrode structure so long as they are mercury-free. Such components may be added to the pasty composition prior to its being dried.

Other methods of manufacturing the zinc electrode will be described in the Examples.

The herein-described zinc electrodes have utility in secondary alkaline electrochemical cells which utilize a material which is more electropositive than zinc as the positive electrode. Such positive electrode materials include nickel, manganese and silver. The electrolytic solutions utilized in such cells include aqueous solutions of alkali hydroxides such as potassium hydroxide, sodium hydroxide and lithium hydroxide.

This invention will be further described by the following examples. All references to "parts" in the examples are to parts by weight.

EXAMPLE 1

A pasty mixture was made from the following constituents: 99 parts of ZnO powder; 0.125 parts of rayon fibers (for structural reinforcement); 15 parts of a 1% by weight aqueous solution of hydroxy ethyl cellulose (sold under the trademark Natrosol 250H of the Hercules Powder Company); 17 parts of distilled water; and one part of lead acetate trihydrate. The pasty mix was prepared by first uniformly dispersing the rayon fibers and dissolving the lead acetate in the distilled water using a stirrer. Thereafter, the hydroxy ethyl cellulose solution was added with stirring until a substantially uniform mix was obtained.

The pasty mixture was spread uniformly between two layers of Aldex-type paper by means of two oscillating doctor blades. The mix per unit area was controlled by the opening between the oscillating blades. The resulting strips of pasty mix between layers of paper were then dried. The dried strips were cut to size by means of a die and one layer of the paper was removed. The current collector (zinc) was then placed between two dried strips (against the surfaces from which the paper had been removed) and the resulting assembly was pressed to the desired thckness (0.055 inch) and had a width of 4.475 inches and height of 5.445 inches.

The resulting zinc electrodes were assembled in silver/zinc cells which consisted of negative zinc and positive silver plates (each positive plate 4.33 inches wide, 5.32 inches high and 0.037 inches thick) sandwiched between the layers of a six-layer separator system consisting of a porous non-woven nylon layer adjacent to the positive plate, four layers of silver treated cellophane in an intermediate position, and a layer of non-woven nylon adjacent to the negative electrode. A 45% by weight solution of potassium hydroxide was added to the cell as the electrolyte solution.

A number of silver-zinc cells made as described above were mixed by sequentially charging and discharging each cell at 2 amps to 2.05 volts cut-off and 6 amps to one volt cut-off, respectively. At the end of 50 cycles, the cells exhibited an average capacity loss of 44.4% from their original capacity.

EXAMPLE 2

The silver/zinc cells were made as described in Example 1 except that 99.5 parts of ZnO and 0.5 parts of cadmium acetate dihydrate were utilized in the preparation of the zinc electrodes rather than the 99 parts of ZnO and one part of lead acetate utilized in Example 1.

A number of these cells were tested by sequentially charging and discharging as described in Example 1. At the end of 50 charge/discharge cycles, the cells had sustained a capacity loss of 46.8% of their original capacity.

EXAMPLE 3

Zinc electrodes were made as described in Example 1 except that one part of HgO was used in place of the lead acetate of Example 1. Silver/Zinc cells were made as described in Example 1 utilizing these mercury-containing zinc electrodes.

These cells were tested as described in Examples 1 and 2 and were found at the end of only 40 charge/discharge cycles to have sustained a capacity loss of 56% over the original capacity. This example illustrates the superiority of the improved electrodes of the present invention (Examples 1 and 2) over mercury-containing electrodes of otherwise generally similar composition (Example 3).

What is claimed is:

1. An improved zinc electrode consisting of mercury-free material, said material comprising a substantially homogeneous admixture of
   (1) zinc active electrode material;
   (2) water-soluble salt which is selected from the group consisting of lead acetate, cadmium acetate and mixtures thereof, said salt being present in an amount sufficient to substantially reduce the evolution of hydrogen gas at said zinc electrode; and,
   (3) water-soluble non-ionic binder which is hydroxy alkyl cellulose, said binder being present in an effective amount to provide a cohesive zinc electrode and to retain said zinc electrode material and acetate substantially homogeneously dispersed in said zinc electrode.

2. The zinc electrode of claim 1 wherein said alkyl group of said hydroxy alkyl cellulose has from 1 to 4 carbon atoms.

3. The zinc electrode of claim 1 which further comprises a current collector in intimate electrical contact with said admixture.

4. The zinc electrode of claim 1 wherein said salt is present in an amount between about 0.05% and about 10% by weight of the weight of said zinc active electrode material.

5. The zinc electrode of claim 4 wherein said binder is present in an amount between about 1% and about 5% by weight of the weight of said zinc active electrode material.

6. An improved mercury-free zinc electrode comprising a substantially homogeneous admixture of
(1) zinc active electrode material selected from the group consisting of zinc metal and zinc oxide;
(2) between about 1.0 and about 1.5, by weight of the weight of said zinc active electrode material of water-soluble salt which is selected from the group consisting of lead acetate, cadmium acetate and mixtures thereof; and,
(3) water-soluble hydroxy alkyl cellulose binder wherein said alkyl group has 1 to 4 carbon atoms and wherein said binder is present in an amount sufficent to bind said acetate and said zinc active electrode material into a cohesive electrode.

7. The zinc electrode of claim 6 wherein said binder is present in an amount between about 1% and about 5% by weight of the weight of said zinc active electrode material.

8. A secondary alkaline battery comprising a zinc electrode, a positive electrode comprising material more electropositive than zinc, and an alkaline electrolyte, said zinc electrode being mercury-free and comprising a zinc active electrode material, between about 0.05% and about 10% by weight, of the weight of said zinc active electrode material, of an additive which is selected from the group consisting of lead acetate, cadmium acetate and mixtures thereof, and an effective amount of water-soluble hydroxy alkyl cellulose binder, said additive being substantially homogeneously dispersed throughout said zinc active electrode material.

9. The battery of claim 8 wherein said alkyl radical of said hydroxy alkyl cellulose binder has from 1 to 4 carbon atoms and said binder is present in a concentration of about 1–5%, by weight of the weight of said zinc active electrode material, and wherein said zinc active electrode material is selected from zinc metal and zinc oxide.

* * * * *